United States Patent [19]

Cooper et al.

[11] Patent Number: 4,528,327
[45] Date of Patent: Jul. 9, 1985

[54] COMPOSITION OF POLYPHENYLENE ETHERS WITH CORE-SHELL RUBBER-MODIFIED POLYSTYRENE

[75] Inventors: Glenn D. Cooper; Arthur Katchman, both of Delmar, N.Y.

[73] Assignee: General Electric Company, Pittsfield, Mass.

[21] Appl. No.: 438,024

[22] Filed: Nov. 1, 1982

Related U.S. Application Data

[63] Continuation-in-part of Ser. No. 353,498, Mar. 1, 1982, abandoned, which is a continuation of Ser. No. 220,165, Dec. 23, 1980, abandoned.

[51] Int. Cl.³ .......................... C08G 61/10; C08K 3/32
[52] U.S. Cl. ..................................... 525/68; 524/141; 523/201
[58] Field of Search .......................... 523/201; 525/68; 524/141

[56] References Cited

U.S. PATENT DOCUMENTS

| 3,600,466 | 8/1971 | Moriguchi et al. | 525/232 |
| 3,825,625 | 12/1971 | Kudo et al. | 525/68 |
| 3,976,725 | 8/1976 | Lee, Jr. | 525/68 |
| 4,101,505 | 7/1978 | Cooper et al. | 525/68 |
| 4,128,602 | 12/1978 | Katchman et al. | 525/68 |
| 4,221,883 | 9/1980 | Mott et al. | 525/232 |
| 4,278,576 | 7/1981 | Goldman | 525/201 |
| 4,373,064 | 2/1983 | Bennett et al. | 525/68 |

Primary Examiner—Paul R. Michl
Assistant Examiner—Peter F. Kulkosky
Attorney, Agent, or Firm—Hedman, Gibson, Costigan & Hoare

[57] ABSTRACT

There are provided thermoplastic compositions comprising a polyphenylene ether and a rubber modified polystyrene resin having a discontinuous phase comprised largely of particles consisting of a core of polystyrene in a shell of a diene rubber membrane, said particles constituting at least 30 percent of the total volume of the rubber-modified polystyrene. Such compositions provide molded articles with substantial and unexpected properties in impact resistance, transparency and surface gloss, particularly at low mold temperatures, in comparison with known compositions of rubber modified polystyrene alone or those of other polystyrenes combined with polyphenylene ethers.

21 Claims, 3 Drawing Figures

COMPOSITION OF POLYPHENYLENE ETHERS WITH CORE-SHELL RUBBER-MODIFIED POLYSTYRENE

CROSS-REFERENCE TO RELATED APPLICATIONS

This is a continuation-in-part of application Ser. No. 353,498, filed Mar. 1, 1982, abandoned, which in turn is a continuation of application Ser. No. 220,165, filed Dec. 23, 1980, abandoned.

BACKGROUND OF THE INVENTION

The polyphenylene ethers are known and described in numerous publications, including Hay, U.S. Pat. Nos. 3,306,874 and 3,306,875; and Stamatoff, U.S. Pat. Nos. 3,257,357 and 3,257,358, all incorporated herein by reference. They are useful for many commercial applications requiring high temperature resistance and, because they are thermoplastic, they can be formed into films, fibers and molded articles. In spite of these desirable properties, parts molded from polyphenylene ethers have low impact strength. In addition, the relatively high melt viscosities and softening points are considered a disadvantage for many uses. Films and fibers can be formed from polyphenylene ethers on a commercial scale using solution techniques, but melt processing is commercially unattractive because of the required high temperatures needed to soften the polymer and the problems associated therewith such as instability and discoloration. Such techniques also require specially designed process equipment to operate at elevated temperatures. Molded articles can be formed by melt processing techniques, but, again, the high temperatures required are undesirable. For example, while poly(2,6-dimethyl-1,4-phenylene)oxide is a tough, temperature-resistant engineering polymer, it is difficult to process.

It is known in the art that the properties of the polyphenylene ethers can be materially altered by forming compositions with other polymers. For example, U.S. Pat. No. 3,379,792 discloses that flow properties of polyphenylene ethers are improved by preparing a composition thereof with from about 0.1 to 25 parts by weight of a polyamide. In U.S. Pat. No. 3,361,851, polyphenylene ethers are formed into compositions with polyolefins to improve impact strength and resistance to aggressive solvents. In U.S. Pat. No. 3,383,435, incorporated herein by reference, there is provided a means to simultaneously improve the melt processability of the polyphenylene ethers and upgrade many properties of polystyrene resins. The latter patent discloses that polyphenylene ethers and polystyrene resins, including many modified polystyrenes, are combinable in all proportions to provide compositions having many properties improved over those of either of the components.

Preferred embodiments of U.S. Pat. No. 3,383,435 are compositions comprising a rubber modified high-impact polystyrene and a poly-(2,6-dialkyl-1,4-phenylene)ether. Such compositions are important commercially because they provide both an improvement in the melt processability of the polyphenylene ether and an improvement in the impact resistance of parts molded from the compositions. Furthermore, such compositions of the polyphenylene ether and the rubber modified high-impact polystyrene may be custom formulated to provide predetermined properties by controlling the ratio of the two polymers.

In preferred embodiments of U.S. Pat. No. 3,383,435, rubber modified polystyrenes are used in compositions with polyphenylene ethers because they provide an increase in toughness, e.g., resistance to impact fracture. However, the use of commercially available graft type rubber modified high impact polystyrenes, such as the LUSTREX HT-88 employed in Example 7 of U.S. Pat. No. 3,383,435, causes a sacrifice in transparency, possibly due to scattering of light by the dispersed elastomeric particulate phase in the rubber modified polystyrene. Moreover, the average of such rubber particles are greater in diameter than about 1 micron, because it has been stated often that if smaller particles are used, the impact strength of the polystyrene will be lowered.

In British Pat. No. 1,180,085, it is disclosed that careful attention to the morphology, i.e., the size and nature of the dispersed phase, in copolymers comprising alkyl acrylates and styrene monomers, rendered impact resistant by inclusion of rubber particles, will lead to enhanced impact strength, without loss in transparency, even though very small particles are used. It is suggested in the British patent that the acrylate copolymer should fill the inside of dispersed globular particles, and that such particle should have a thin rubbery membrane or shell surrounding it.

The said British patent states, however, that to try the same technique with polystyrene alone is unsuccessful—the product will mold into a material of low impact strength and, also significantly, the resin will be poor in transparency. On page 15 of the British patent, this failure of polystyrene to qualify as a suitable, useful composition is laid, at least in part, to the magnitude of the difference between the refractive index of the rubber component and the resin, i.e., homopolystyrene, component. It is stated that such difference must not be in excess of 0.005 refractive index units.

Thus the British patent expressly teaches that the only useful compositions must always include an alkyl methacrylate in the thermoplastic matrix, and further, that there never can be greater than a 0.005 difference in refractive index between that of the rubber and that of the thermoplastic. Moreover, there is no suggestion that such compositions will be useful to modify other thermoplastic resins, and carry their transparency into such modified compositions and, particularly, there is no suggestion to use any such resins, and especially entirely polystyrene based resins, in compositions with polyphenylene ethers.

More recently, it has unexpectedly been found that a rubber modified polystyrene in which particles made up of a core of polystyrene surrounded by a diene rubber membrane, having a diameter of about 0.1 to 0.7 microns and dispersed throughout a continuous polystyrene phase, will combine with polyphenylene ether resins to give compositions which when molded have higher impact strength, transparency and higher gloss than known blends. The unusual morphology of the rubber modified polystyrene seems to be responsible for the observed advantages. Compositions of polyphenylene ether with a rubber modified polystyrene containing particles in which many polystyrene inclusions are present, are not as tough nor do they have as high a surface gloss. This discovery is described by James G. Bennett, Jr. and Gim F. Lee, Jr. in copending application Ser. No. 246,383, filed Mar. 23, 1981, now U.S. Pat. No. 4,373,064, assigned to the same assignee as herein.

SUMMARY OF THE INVENTION

It has now been discovered further that compositions of a polyphenylene ether and a rubber modified polystyrene, wherein the latter is comprised of a continuous polystyrene phase containing dispersed rubbery particles of core-shell structure in which the rubbery particles constitute at least 30 percent by volume of the rubber modified polystyrene, when molded possess the same types of improved properties previously thought possible by controlling only the rubber particle size.

DESCRIPTION OF THE DRAWINGS

FIG. 2 is a transmission electron microphotograph, at 15,000 diameters magnification, of a section of a rubber modified polystyrene which is employed in the instant invention. The discontinuous, particulate phase, is seen to consist largely of single particles of polystyrene (light areas) surrounded by a thin rubber (dark area) membrane or shell. The core-shell particles are from about 0.2 to 0.4 microns in diameter, with an average diameter of about 0.3 microns. An example of such a rubber modified polystyrene is known as BASF 2791, which is commercially available from the BASF Co. As will also be seen from the accompanying examples, this material is characterized by a rubbery phase volume of greater than 30 percent, specifically, 35 percent, in accordance with the invention.

Figure 2:
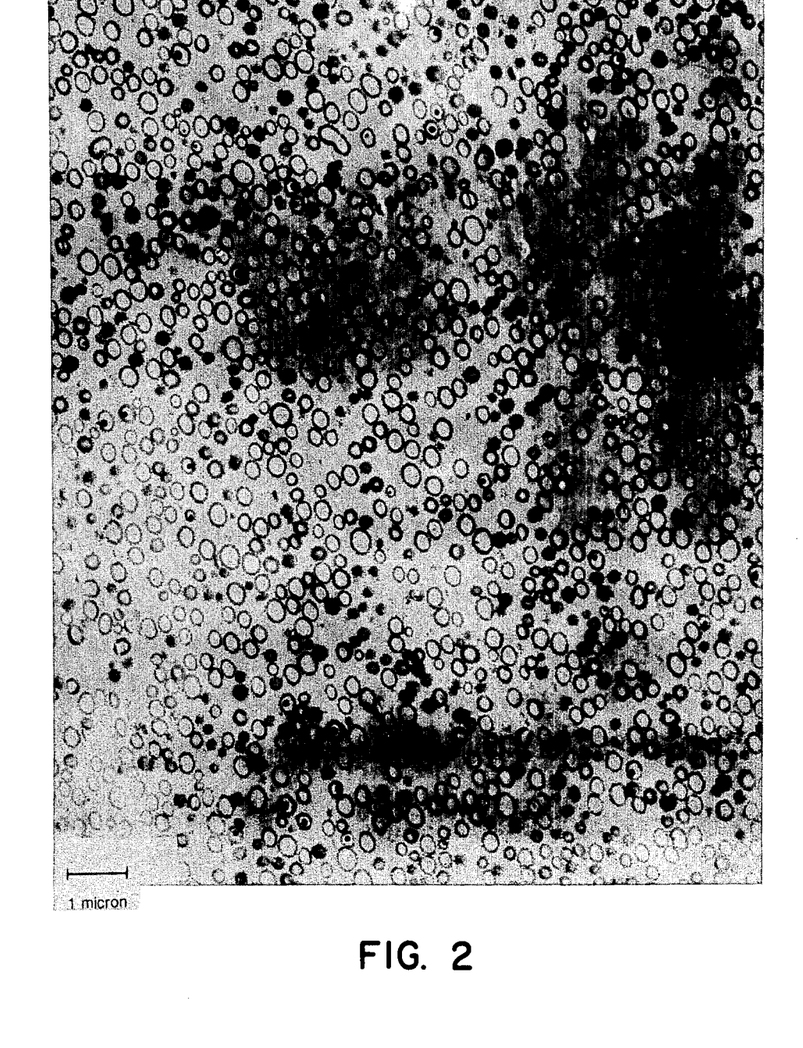

The particles of BASF 2791 are largely of the core-shell type, with a polystyrene core surrounded by a rubber membrane, but other types of particles are present as well. Some particles consist simply of a solid rubber sphere, some have a rubber sphere at the core, which is surrounded by a thick shell of polystyrene, which is in turn surrounded by a rubber membrane. A few even more complex structures are present; spheres of polystyrene with a rubber shell, another shell of polystyrene, and a final shell of rubber. A count of 100 particles in a randomly chosen section of the transmission electron microphotograph showed the following distribution:

core-shell: 61
solid rubber spheres: 28
clumps of rubber particles: 6
rubber-polystyrene-rubber: 6

DETAILED DESCRIPTION OF THE INVENTION

According to the present invention, in its broadest aspects, there are provided thermoplastic compositions with unexpectedly high impact strength, greatly improved surface gloss and transparency comprising a polyphenylene ether, and a rubber modified polystyrene, the rubber modified polystyrene comprising a continuous polystyrene phase or matrix in which there is dispersed a discontinuous phase comprised largely of particles of a styrene homopolymer surrounded by a diene rubber membrane, said particles constituting at least 30 percent of the volume of the rubber modified polystyrene, preferably having an average size ranging from about 0.2 to about 0.4 microns (average diameter about 0.3 microns). The rubber content will range from about 6 to about 15% by weight of the rubber modified polystyrene component, with the proviso that in all cases the rubbery particles will constitute at least 30 percent by volume of the total.

In general, the compositions according to this invention are prepared by combining said polyphenylene ether and a rubber modified polystyrene to obtain a composition which also has at least two phases, one of which is discontinuous and comprises the rubber-encased polystyrene particles and the continuous phase comprising polyphenylene ether and polystyrene. Such compositions may be molded to shape using conventional molding procedures.

According to a preferred aspect of this invention, there are provided high impact strength and improved surface gloss thermoplastic compositions comprising (a) from 10 to 90 parts by weight of a polyphenylene ether resin and (b) from 90 to 10 parts by weight of a rubber modified polystyrene resin, the preferred range being from 20-80 parts by weight of (a) and 80-20 parts by weight of (b). The rubber modified polystyrene contains a disperse phase of particles composed of polystyrene surrounded by a polybutadiene or rubbery copolymer of butadiene with up to about 60% by weight of styrene. Most preferably, in the rubber modified polystyrene component, the rubber will comprise from about 6 to 15% by weight.

It has been found that compositions containing about 60-80% of component (a) are tough and transparent or substantially transparent. Clarity and color are also improved by the addition of (c) a plasticizing flame-retardant, such as a triaryl phosphate. The preferred triaryl phosphate is triphenyl phosphate. Mixed triaryl phosphate with one or more isopropyl groups on some or all of the aryl rings, such as KRONITEX ®50 supplied by Food Machinery Corp., can also be used. In general, the amount of (c) will be about 3-20 parts by weight, per hundred parts (phr) of components (a) and (b).

Figure 1:
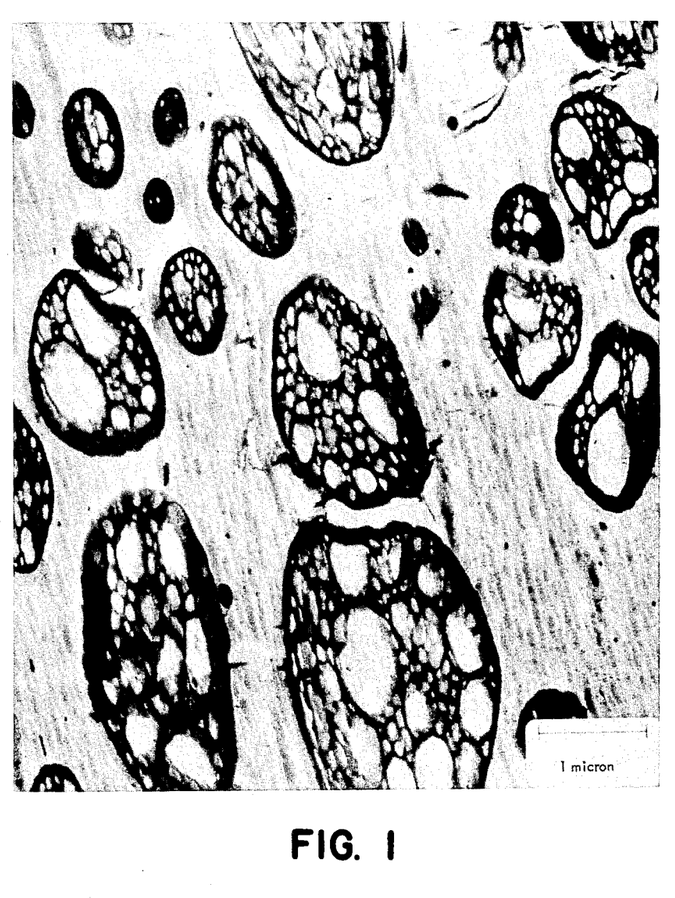
FIG. 1 is a transmission electron microphotograph, 30,000 diameters magnification, of a section of rubber modified polystyrene, which would not be used in the instant invention, showing the prevailing morphology of the rubber particles in a commercial high impact polystyrene prepared by graft polymerization, such as, a composition known as FG-834 sold by Foster Grant Co. The numerous "salami" like spots within each particle are due to polystyrene inclusions throughout each particle. The particles are cellular in structure rather than core-shell structures.
Figure 3:
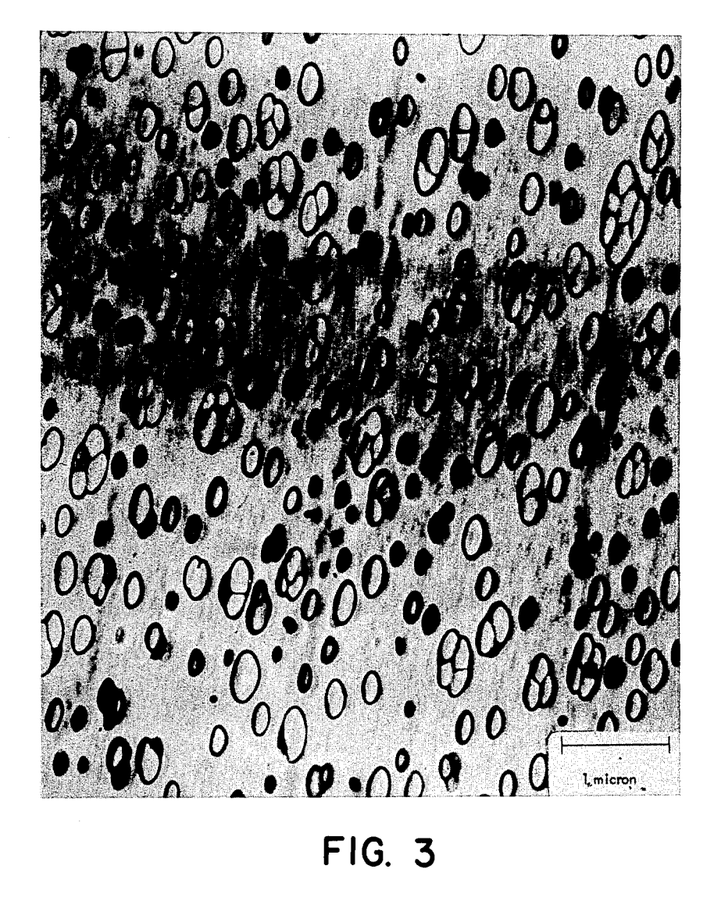
FIG. 3 is a transmission electron microphotograph, 30,000 diameters magnification, of another rubber modified polystyrene, known as BASF 2790, sold by the BASF Company. While BASF 2790 is of the core-shell type, it contains many particles composed of 2-4 cells. Notably, as will be seen from the examples set forth below, this material is characterized by a rubbery phase volume (i.e., the volume of the rubbery particles in relation to the total volume) of less than 30 percent, specifically, 26 percent.

Methods to determine the morphology of resin systems are well known to those skilled in the art. One convenient method comprises examination of electron microscope photographs of mounted, sectioned specimens. Three such photographs are shown in FIGS. 1, 2 and 3. The techniques are well known to those skilled in the art.

Determination of the rubbery phase volume, that is, the percent of the rubber modified polystyrene which is made up of the rubbery particles themselves, can also be accomplished by use of established procedures. One such procedure, described in the Handbook of Chemical Microscopy, Chamot and Mason, is repeated below.

The compositions of this invention generally consist of a mixture of two phases, the continuous phase being a matrix of polyphenylene oxide resin and styrene resin in which there is a discontinuous gel phase dispersed comprising particles of polystyrene surrounded by a diene rubber membrane of the morphology hereinabove described. It is important that the particles dispersed as shown in FIG. 2, comprise more than 50% and preferably to at least about 60% of the total number of rubber particles.

The present compositions are prepared by combining such a rubber modified polystyrene resin with the polyphenylene ether. The rubbery particles are provided by polymerizing styrene in the presence of dissolved rubber under conditions to be specified, whereby a continuous phase of a solution of rubber in styrene becomes dispersed in the form of particles of rubber surrounding a shell of polystyrene, in a matrix of the polystyrene. The particle size and form in the final composition is kept substantially the same by using blending techniques, e.g., extrusion or milling, which avoid particle degradation.

The polyphenylene ethers with which this invention is concerned are fully described in the above-mentioned references. The polyphenylene ethers are self-condensation products of monohydric monocyclic phenols produced by reacting the phenols with oxygen in the presence of complex metal catalysts. In general, molecular weight will be controlled by reaction time, longer times providing a higher average number of repeating units.

A preferred family of polyphenylene ethers will have repeating structural units of the formula:

wherein the oxygen ether atom of one unit is connected to the benzene nucleus of the next adjoining unit, n in a positive integer and is at least 50, and Q, Q', Q'' and Q''' are independently selected from the group consisting of hydrogen, halogen, hydrocarbon radicals, halohydrocarbon radicals, hydrocarbonoxy radicals, and halohydrocarbonoxy radicals.

Illustrative members are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like. Examples of polyphenylene ethers corresponding to the above formula can be found in the above referenced patents of Hay and Stamatoff.

Also included are copolymers, such as copolymers of 2,6-dimethylphenol with other phenols, for example, with 2,3,6-trimethylphenol or 2-methyl-6-butylphenol, etc.

For purposes of the present invention an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with the relevant polystyrene resins over the entire range of combining ratios.

Suitable polystyrene matrix resins are derived from a monovinyl aromatic monomer, e.g., one having the formula:

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene matrix resins include homopolymers of polystyrene; polychlorostyrene; poly-a-methylstyrene; poly(4-methylstyrene); polyvinyl toluene; and the like, or mixtures of the foregoing. These resins will also comprise the inclusions in the diene rubber membrane envelopes. The most preferred polystyrene is homopolystyrene.

The "rubber" used to envelope the polystyrene resin and provide the disperse phase includes polymeric materials, natural and synthetic, which are elastomers at room temperatures, e.g., 20° to 25° C. The term "rubber" includes, therefore, natural or synthetic rubbers of the diene elastomer type generally used in preparing impact polymers. All such rubbers will form a two phase system with the polystyrene resin, and will comprise the discontinuous phase in the impact resistant polystyrene resin composition. Illustrative rubbers for use in this invention are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are natural crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods employing heterogeneous catalyst systems, such as a trialkylaluminum and a titanium halide, for example. Among the synthetic rubbers which may be used in preparing the present compositions are elastomeric modified diene homopolymers, e.g., hydroxy- and carboxy-terminated polybutadienes; polychlorobutadienes, e.g., neoprenes; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; and the like. The preferred rubbers comprise polybutadiene and rubbery copolymers of butadiene with styrene. Such preferred rubbers are widely used in forming rubber modified high impact polystyrene resins with a broad range of properties.

A suitable method for preparing the rubber modified polystyrene having particles of the type described above, and used in the present compositions is derived from the general disclosure described by Echte in Angewandte Makromolekulare Chemie 58/59 p. 175 (1977).

In general, rubber modified polystyrene having particles of the type described above, are conveniently prepared by polymerization of solutions in styrene of styrene-butadiene block copolymers having suitable molecular weights and styrene-butadiene ratios as described in the aforesaid Angewandte Makromolekulare Chemie publication. Such a polystyrene is one obtained from a diblock copolymer containing 70% butadiene and 30% styrene with a polystyrene block length of 49,000. An example of a rubber-modified polystyrene having the morphology herein above described which is employed in the invention is known as BASF 2791, which has been mentioned heretofore.

As is described in the above-mentioned U.S. Pat. No. 3,383,435, polyphenylene ethers and polystyrene resins are combinable with each other in all proportions. The present compositions therefore can comprise from 1 to 99% by weight polyphenylene ether resin and from 99 to 1% by weight polystyrene resin, and these are included within the scope of the invention. In general, compositions in which the polyphenylene ether resin comprises from about 10 to about 90% and the rubber-modified polystyrene comprises from about 90 to about 10%, by weight of the total resinous components, are preferred because after molding they have the best combination of impact strength, and surface gloss. Particularly useful and preferred are compositions in which the polyphenylene resin component comprises from about 20 to 80% by weight of the combined weight of the total resinous components in the composition. Impact strength and surface gloss appear to be at a maximum in such preferred compositions, and transparency in the range of about 60% or more.

The method used to form the compositions of the invention is not critical provided that it permits efficient dispersion and mixing. The preferred method is one in which the polyphenylene ether is mixed with the rubber modified polystyrene using any conventional mixing method and the composition so formed is molded to any desired shape such as by extrusion, compression molding, injection molding, and the like.

It should, of course, be obvious to those skilled in the art that other additives may be included in the present compositions such as plasticizers, pigments, flame retardant additives, reinforcing agents, such as glass filaments or fibers, stabilizers, and the like.

DESCRIPTION OF THE PREFERRED EMBODIMENTS AND COMPARISON WITH PRIOR ART

The advantages obtained by providing compositions of a polyphenylene ether resin and a rubber modified polystyrene of the specified morphology are set forth in the following examples which further illustrate the invention but are not to be construed as limiting the invention. Parts are by weight.

The physical tests set forth in the tables are carried out by the following procedures: $\frac{1}{8}"$ notched Izod Impact Strength, ASTM D-256; elongation (Elong) at break, ASTM D-639, [Tensile yield strength (T.Y.), ASTM D-638; Heat-Deflection-Temperature (HDT), ASTM D-648; Gardner Falling Dart Impact, and Gloss.] For comparison purposes, control specimens are also prepared.

Example 1, below, comprises a comparison of a blend in accordance with the invention, containing BASF 2791, with three other blends containing high impact rubber modified polystyrene resins of the core shell type. The three comparison materials were: (1) BASF 2790, (2) DXP-9 and (3) Sample "A".

BASF 2790, BASF 2791 and DXP-9 were all obtained from commercial sources. The material designated "Sample A" was made as follows:

SAMPLE A—PREPARATION

A solution of 100 grams of a rubbery block copolymer of styrene and butadiene (Solprene 308, Phillips Petroleum) in 900 grams of styrene was transferred to a one gallon reactor vessel, to which 1.2 grams of dicumyl peroxide and 1.0 gram of tert-dodecyl mercaptan were also added. The reactor was purged with gaseous nitrogen, the mixture was stirred and heated for three hours at 115° C. and then it was transferred by means of a gear pump to a second reactor containing 6 grams of poly(vinyl alcohol) and 4.5 grams of gelatin in 2 liters of water. The polymer was suspended and polymerization was completed by heating the mixture for five hours at 20° C., then for 6 hours at 140° C. The product was obtained in the form of large chunks, which were then chopped and extruded in a single-screw extruder. Examination by transmission electron microscopy showed that most of the dispersed rubbery particles were of the core-shell structure, with a few more complex particles.

Prior to their use in blends with a polyphenylene ether resin, each of the four rubber modified polystyrenes was examined to determine the rubbery phase volume and the average rubber particle diameter by use of the following procedures.

MEASUREMENT OF RUBBER PHASE VOLUME AND AVERAGE PARTICLE DIAMETER

The average particle diameter was estimated by dropping a transparent plastic ruler at random on a transmission electron miscroscopy (TEM) photograph of the sample, measuring the size of the first twenty particles contacted by the ruler, and computing an average.

To compensate for the fact that not all of the particles are cut at their maximum diameter, the average diameter of the cross-section of the particles in the TEM photograph was multiplied by 1.27 to approximate the true average particle diameter. See Handbook of Chemical Microscopy, infra, page 466.

The rubbery phase volume of each sample (i.e., the fraction of the total volume made up the rubbery particles) was measured by the method of linear intercepts, in accordance with the description in the Handbook of Chemical Microscopy, Chamot and Mason, Volume I, 3d Edition, page 486 (1966), as summarized below:

On each of two TEM photographs at a magnification of 25,000 times, five straight lines were laid off with a ruler, horizontally, at five different places along the vertical axis. On each line, for each rubber particle intersected, the length of the segment of the ruler passing through was noted in millimeters. The lengths of the ruler segments passing through rubber particles were added and the total was recorded. The total length of the ten lines (five from each of two TEM photographs) was also recorded. The rubbery phase volume (stated another way: the volume fraction of the rubber phase) for each sample was computed by dividing the former number by the latter number. The results are listed below.

| Core-shell HIPS | Ave. Particle Diam. (Microns) | Rubbery Phase Volume (%) |
| --- | --- | --- |
| BASF 2791 (BASF CO.) | 0.31 | 35 |
| BASF-2790 (BASF CO.) | 0.54 | 26 |
| DXP-9 (Experimental product supplied by Dow Chemical Co.) | 0.20 | 20 |
| Sample A (See above) | 0.56 | 27 |

The four samples of rubber modified polystyrene shown above were employed in a blend with polyphenylene ether resin as described in Example 1 below.

EXAMPLE 1

A mixture of 80 parts by weight of poly(2,6-dimethyl-1,4-phenylene)oxide (General Electric's PPO ® resin), 20 parts by weight of rubber modified high impact polystyrene having core-shell rubber particle morphology, and 5 parts by weight of triphenyl phosphate were extruded in a single screw extruder, the extruded strands were chopped into molding pellets, and the pellets were molded into standard test pieces using a screw-injection molding machine. The properties of the molded pieces are given below:

| Polystyrene Used | BASF 2791* | BASF 2790** | DXP-9** | A** |
| --- | --- | --- | --- | --- |
| Elongation, % | 102 | 54 | 35 | 78 |
| Tensile Yield Strength, psi | 12,000 | 12,000 | 11,600 | 11,500 |
| Notched Izod Impact strength, ft. lbs./in. n | 3.2 | 2.6 | 1.1 | 2.6 |
| Gardner Impact strength, in. lbs. | 125 | 20 | 30 | 35 |

*according to invention
**comparison experiment

It was observed that the blends had good surface gloss, transparency in the unpigmented condition, and satisfactory properties generally, but the impact strength, and especially the Gardner impact strength, was sensitive to the volume fraction of the rubbery phase of the core-shell HIPS employed. As can be seen, there is at least a two-fold increase in Gardner impact strength between the blend containing BASF 2790 (having a 26% volume fraction) and the blend containing BASF 2791 (having a 35% volume fraction, in accordance with the invention). Notably, there is not much change in the Gardner impact strength in going from a rubbery phase volume of 20% to 27% (i.e., the blend containing DXP-9 versus the blend containing Sample A), but there is almost a four-fold increase in Gardner impact between a rubbery phase volume of 27% and 35% (blend containing Sample A versus blend containing BASF 2791). Moreover, the increase in impact strength achieved with a rubbery phase volume above 30% does not appear to be dependent upon the particle size: even though DXP-9 has a smaller particle size, BASF 2791 confers higher impact strength.

Blends in accordance with the invention are illustrated further in the following additional examples. In these examples, comparison has also been made with Foster Grant's FG834 and Monsanto's HT-91, each of which is a rubber modified polystyrene that does not have the specified core-shell morphology.

EXAMPLE 2

A mixture of 50 parts of poly(2,6-dimethyl-1,4-phenylene)ether and 50 parts of BASF 2791 polystyrene, (a rubber modified polystyrene resin comprising a continuous polystyrene phase containing dispersed particles consisting largely of a core of polystyrene in a shell of diene rubber membrane, the particles having an average diameter of about 0.3 microns and constituting 35 percent of the total volume of the rubber modified polyphenylene), 1.5 parts of polyethylene, 1 part of diphenyldecyl phosphite, 3 parts of triphenyl phosphate, 0.15 parts of zinc sulfide and 0.15 parts of zinc oxide was extruded at 560° F. in a 28 mm. twin-screw extruder. The extruded pellets were molded into standard test pieces at 520° F. in a 3 oz. screw injection molding machine. For comparison, blends were similarly prepared from BASF-2790 polystyrene and Foster-Grant 834 polystyrene, described herein above. The blends with BASF-2791 had higher Izod and Gardner impact strength and greater surface gloss. The results of testing of the compositions are set forth in the following table:

| Polystyrene | Elong. % | T.Y. (psi) | Izod Impact (ft. lbs./in.) | Gardner Impact (in. lbs.) | HDT (°F.) | Gloss (45°) |
| --- | --- | --- | --- | --- | --- | --- |
| BASF 2791 | 50 | 9,800 | 4.0 | 250 | 237 | 65.7 |
| BASF 2790 | 40 | 10,000 | 2.8 | 50 | 238 | 52.9 |
| FG-834 | 51 | 9,800 | 3.5 | 100 | 244 | 50.8 |

EXAMPLE 3

A mixture of 60 parts of polyphenylene ether (PPO) described in Example 2, 40 parts of BASF 2791 polystyrene (PS), 0.15 parts of zinc sulfide, 0.15 parts of zinc oxide, and 1 part of diphenyldecyl phosphite was extruded in a single screw extruder and then molded as described in Example 2, along with control blends of the same composition with BASF-2790 or FG-834 in place of BASF-2791.

Mixtures of 80 parts of PPO and 20 parts of the above mentioned polystyrenes (BASF-2791, BASF-2790 and FG-834) were extruded and molded in the same way.

Impact strength and gloss were highest in the blend containing BASF-2791 in both compositions, as compared with the blends containing the other polystyrenes as shown in the table below.

A mixture of 90 parts of PPO and 10 parts of BASF 2791 polystyrene was extruded and molded in the same way. The properties are also included in the table.

| Polystyrene | PPO:PS | Izod | Gardner | HDT | Gloss (Units) |
|---|---|---|---|---|---|
| BASF 2791 | 60:40 | 4.1 | 225 | 271 | 66.4 |
| BASF 2790 | 60:40 | 3.0 | 125 | 271 | 54.5 |
| FG-834 | 60:40 | 3.5 | 125 | 273 | 51.7 |
| BASF 2791 | 80:20 | 3.5 | 225 | 313 | 63.5 |
| BASF 2790 | 80:20 | 2.6 | 40 | 304 | 50.2 |
| FG-834 | 80:20 | 2.9 | 75 | 304 | 50.7 |
| BASF 2791 | 90:10 | 2.5 | 125 | 322 | 60.0 |

EXAMPLE 4

Example 2 was repeated with the addition of 3 phr of $TiO_2$ to each blend. The test results are as follows:

| Polystyrene | Elong. | T.Y. | Izod | Gardner | HDT | Gloss (Units) |
|---|---|---|---|---|---|---|
| BASF 2791 | 75 | 10,000 | 3.6 | 175 | 233 | 63.3 |
| BASF 2790 | 57 | 10,000 | 2.8 | 50 | 236 | 58.7 |
| FG-834 | 65 | 9,600 | 3.6 | 125 | 241 | 54.1 |

EXAMPLE 5

A mixture of 60 parts of BASF 2791 polystyrene, 40 parts of PPO and 3 parts of titanium dioxide was extruded in a twin-screw extruder and molded as described in Example 2. Blends of this same composition, with BASF 2791 replaced by BASF-2790 polystyrene, Foster Grant 834 polystyrene, or Monsanto HT-91 polystyrene were similarly prepared. Monsanto HT-91 is a high impact polystyrene containing about 6% by weight of polybutadiene, with about 95 percent of the particles being greater than 0.5 microns in size. It is sold by the Monsanto Co.

The test results are as follows:

| Polystyrene | Izod | Gardner | HDT | Gloss (Units) |
|---|---|---|---|---|
| BASF 2791 | 2.9 | 125 | 238 | 64.1 |
| BASF 2790 | 2.1 | 15 | 240 | 61.9 |
| FG-834 | 3.2 | 50 | 237 | 55.0 |
| HT-91 | 1.3 | 10 | 250 | 58.2 |

EXAMPLE 6

A mixture of 60 parts BASF 2791 polystyrene, 40 parts PPO, 1.5 parts polyethylene, 8 parts triphenyl phosphate, 0.5 parts diphenyl decyl phosphite, 3 parts titanium dioxide, 0.15 parts of zinc sulfide and 0.15 parts of zinc oxide was extruded and molded as described in Example 2, along with a control bend made with Amoco 6H6, a high-gloss polystyrene.* The composition containing BASF 2791 had higher impact strength than the control. The surface gloss of plaques molded with a mold temperature of 130° F. was as good as that obtained with the control at 175° F. The test results are set forth in the following table:

| Property | Amoco 6H6 | BASF 2791 |
|---|---|---|
| Elongation | 68% | 78% |
| T.Y. | 7200 | 8000 |
| T.S. | 6600 | 7100 |
| Izod (73°) | 2.8 | 4.0 |
| Izod (−40°) | 1.3 | 1.4 |
| Gardner | 150 | 225 |
| HDT | 202 | 201 |
| Gloss (130° mold) | 54.8 | 60.8 |
| Gloss (175° mold) | 60.9 | 62.8 |

*available from Amoco Chemical Co.

EXAMPLE 7

PPO was mixed with BASF 2791 rubber-modified polystyrene and extruded in a twin screw extruder as described in Example 2 to produce blends containing 10%, 15% and 20% PPO. To assure uniformity each blend was then re-extruded in the same machine. The extruded pellets were molded in an injection molding machine as described in Example 2 and properties were compared to those of BASF 2791 alone without addition of PPO. As little as 10% PPO produces a significant increase in HDT and tensile strength, but Gardner impact strength is reduced. With 20% PPO Gardner impact strength is not reduced and all other properties are improved. The test results are set forth in the following table:

| % PPO | HDT | Tensile Strength | Elong. | Izod Impact | Gardner Impact |
|---|---|---|---|---|---|
| 0 | 185 | 5800 | 30 | 1.9 | 50 |
| 10 | 191 | 6700 | 37 | 2.4 | <5 |
| 15 | 203 | 7500 | 24 | 1.8 | <5 |
| 20 | 212 | 8000 | 61 | 3.0 | 50 |

EXAMPLE 8

Blends of PPO and BASF 2791 rubber-modified polystyrene (PS) were prepared as described in Example 3 at PPO:PS ratios of 60:40, 70:30, and 80:20. No zinc salts were included; each blend contained 1 phr of diphenyldecyl phosphite and 12 phr of triphenyl phosphate. A 60:40 blend with Foster Grant 834 polystyrene was also prepared in the same way. The blends containing BASF 2791 were transparent, while the blend containing Foster Grant 834 was almost completely opaque. Properties are listed in the following table.

| PPO:PS | PS | Izod | Gardner | Appearance |
|---|---|---|---|---|
| 60:40 | BASF 2791 | 5.0 | 200 | Transparent |
| 60:40 | FG 834 | 3.0 | 150 | Opaque |
| 70:30 | BASF 2791 | 4.6 | 225 | Transparent |
| 80:20 | BASF 2791 | 3.7 | 250 | Transparent |

It is thus seen that compositions according to this invention have a greater impact strength, transparency and gloss than that of any of the controls.

Other modifications can be made, based on the teachings of the foregoing specific examples.

For example, if the procedure of the Examples is repeated and the following polyphenylene ethers are substituted for poly(2,6-dimethyl-1,4-phenylene)ether in the formulation:
poly(2,6-diethyl-1,4-phenylene)ether;
poly(2-methyl-6-ethyl-1,4-phenylene)ether;

poly(2-methyl-6-propyl-1,4-phenylene)ether;
poly(2,6-dipropyl-1,4-phenylene)ether,
poly(2-ethyl-6-propyl-1,4-phenylene)ether,
poly(2,6-dimethyl-co-2,3,6-trimethyl-1,4-phenylene)ether,
poly(2,6-dimethyl-co-2-methyl-6-butyl-1,4-phenylene)ether,
compositions according to this invention will be obtained.

The compositions of the subject invention can be formed into films, fibers and molded articles. They can be used to make molded products, such as housing, cabinets, frames for appliances, business machines, etc. pump housings, impellers, filters, and the like. They may be mixed with various fillers and modifying agents, such as dyes, pigments, stabilizers and plasticizers, and the like.

All of the foregoing patents and/or publications are incorporated herein by reference. Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic composition comprising:
   (a) a polyphenylene ether resin; and
   (b) a rubber-modified polystyrene which comprises a continuous polystyrene phase containing dispersed rubbery particles, the majority of said particles consisting of a core of polystyrene in a shell of diene rubber membrane, said rubbery particles constituting at least 30 percent of the total volume of the rubber-modified polystyrene and having an average size ranging from about 0.2 to about 0.4 microns.

2. A composition as defined in claim 1, wherein said rubber modified polystyrene resin contains from about 6 to about 15% by weight of said diene rubber.

3. A composition as defined in claim 1, wherein the diene rubber is a polybutadiene or a rubbery copolymer of styrene and butadiene.

4. A composition as defined in claim 1, wherein the polyphenylene ether resin comprises from about 10 to about 90% by weight of the combined weight of the total resinous components in the composition.

5. A composition as defined in claim 4, wherein said polyphenylene ether resin comprises from about 20 to about 80% by weight of the combined weight of the total resinous components in the compositions.

6. A composition as defined in claim 1, wherein said polyphenylene ether has the repeating structural formula:

wherein the oxygen ether atom of one unit is connected to the benzene nucleus of the next adjoining unit, n is a positive integer and is at least 50, and Q, Q', Q" and Q'" are independently selected from the group consisting of hydrogen, halogen, hydrocarbon radicals, halohydrocarbon radicals, hydrocarbonoxy radicals, and halohydrocarbonoxy radicals.

7. A composition as defined in claim 1, in which said polyphenylene ether is poly(2,6-dimethyl-1,4-phenylene)ether.

8. A composition as defined in claim 1, which contains 50–80 parts of component (a) and 20–50 parts of component (b), said composition when molded having a high impact strength, transparency and surface gloss.

9. A composition as defined in claim 1, in which the dispersed particles have an average particle diameter of about 0.3 microns.

10. A composition as defined in claim 1, which contains (c), a plasticizing flame-retardant.

11. A composition as described in claim 10, wherein (c) is a triaryl phosphate in an amount of about 3 to about 20 parts by weight per hundred parts of components (a) and (b).

12. A composition as described in claim 11, wherein the triaryl phosphate is triphenyl phosphate.

13. A composition as defined in claim 6, wherein Q is alkyl having from 1 to 4 carbon atoms.

14. A composition as defined in claim 13, wherein Q is methyl.

15. A molded composition having high impact strength, transparency and surface gloss obtained by molding a composition comprising (a) a polyphenylene ether resin and (b) a rubber-modified polystyrene which comprises a continuous polystyrene phase containing dispersed rubbery particles, the majority consisting of a core of polystyrene in a shell of diene rubber membrane, said rubbery particles constituting at least 30 percent of the total volume of the rubber-modified polystyrene and having an average size ranging from about 0.2 to about 0.4 microns.

16. A molded composition according to claim 15, in which the polyphenylene ether resin is poly(2,6-dimethyl-1,4-phenylene ether).

17. A process for preparing the composition described in claim 1 or 7, which comprises mixing and dispersing the components (a) and (b) to form a blend thereof.

18. A process according to claim 17, wherein the resulting blend is formed to any desired shape.

19. A process according to claim 18, wherein the blend is formed into any desired shape by compression molding.

20. A process according to claim 18, wherein the blend is formed into any desired shape by injection molding.

21. A process according to claim 18, wherein the blend is formed into any desired shape by extrusion molding.

* * * * *